Patented Aug. 4, 1931

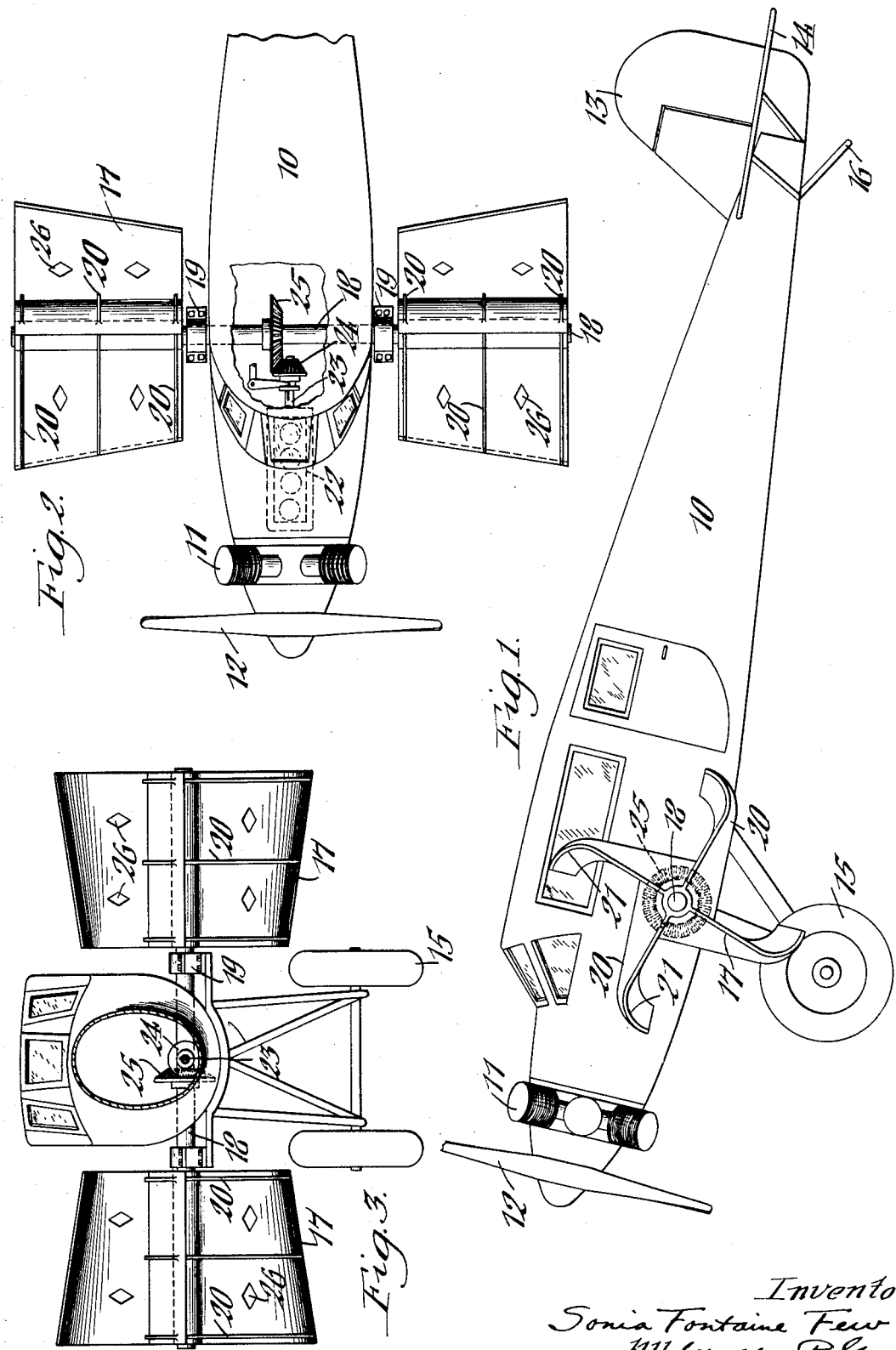

1,816,898

UNITED STATES PATENT OFFICE

SONIA FONTAINE FEW, OF NIAGARA FALLS, NEW YORK

AIRPLANE

Application filed December 29, 1928, Serial No. 329,153. Renewed December 15, 1930.

This invention relates to improvements in airplanes and more particularly to a novel wing construction.

Its chief object is the provision of a revolving wing construction which will not only afford stability and smooth riding but which will also assist in lifting and propelling the plane.

Other features of the invention reside in the construction and arrangement of its parts which will be hereinafter more fully described and particularly pointed out in the appended claims.

In the accompanying drawings:—

Figure 1 is a side elevation of an airplane of my invention. Figure 2 is a fragmentary top plan view thereof. Figure 3 is a front view of the airplane, partly in sectiion.

Similar characters of reference indicate corresponding parts throughout the several views.

While the airplane, in its general characteristics, may be of any appropriate and well-known construction, that shown in the drawings comprises a main body or fuselage 10 provided at its front end with a motor 11 and propeller 12, and at its rear end with the vertical and horizontal rudders 13 and 14, respectively. The landing gear of the plane consists of front wheels 15 and a rear tail piece 16.

Disposed on opposite sides of the airplane-body adjacent its front end are revolving wings or vanes 17 which act to produce both a lifting and a propelling force in addition to that of stabilizing the plane. These wings are mounted on a horizontal driving shaft 18 disposed transversely to the longitudinal axis of the body 10 and extend an equal distance from opposite sides thereof. Said shaft is journaled in suitable bearings 19 and the wings 17 are disposed radially thereon, ribs or webs 20 being provided on their upper faces for reinforcing them. As shown in the drawings, the outer edges of the wings converge inwardly toward the axis of the shaft 18 and direct the air downwardly against the underside of the fuselage to cause the machine to rise. At their outer ends the wings are curved or cupped, as shown at 21, to pocket and grip the air. These wings are revolved forwardly or in a counter-clockwise direction and not only exert a lifting force but a propelling force to drive the plane through the air.

While the wing-shaft 18 may be driven from the propeller-motor 11, it is preferably driven by a separate motor 22 housed in or otherwise supported on the fuselage 10 and having its shaft 23 provided with a gear 24 meshing with a similar gear 25 on the wing-shaft.

The wings 17 are provided with a plurality of perforations 26 which permit the displacement of a certain amount of air therethrough when the wings are at rest during the descent of the plane.

It is to be understood that while I have shown but one set of wings disposed on either side of the fuselage, any number of sets may be employed, depending on the size of the plane and the load carried.

The provision of revolving wings on the airplane provides an extensive bearing surface for sustaining the same when in flight and augments the action of the propeller in driving the plane through the air. Furthermore, it adds materially to the safety of flying in that the revolving wings, even when released from their motor, should it fail, are free to revolve by the action of the air against them and thereby resist any sudden falling of the plane, enabling the pilot to bring his machine to earth without danger of a crash.

I claim as my invention:—

1. A flying machine, comprising a body, propelling means therefor, rotatable supports extending from opposite sides of said body transversely to the longitudinal axis thereof, and radial wings mounted on said supports and having their outer edges converging inwardly toward said body to direct the air against the undersurface thereof.

2. A flying machine, comprising a body, propelling means therefor, rotatable supports extending from opposite sides of said body transversely to the longitudinal axis thereof, and radial wings mounted on said supports and having their outer portions cupped and converging inwardly toward said body to direct the air against the undersurface thereof.

3. A flying machine, comprising a body, propelling means therefor, a shaft journaled transversely of said body and extending from opposite sides thereof, means for driving said shaft, and radial wings mounted on said shaft for exerting both a lifting and a propelling force, the wings converging inwardly at their edges toward the axis of said shaft to direct the air against the undersurface of said body.

4. A flying machine, comprising a body, propelling means therefor, rotatable supports extending from opposite sides of said body transversely to the longitudinal axis thereof, and radial wings mounted on said supports and having openings therein, at a point spaced from their axes of rotation, said wings being shaped to direct the air against the undersurface of said body.

SONIA FONTAINE FEW.